United States Patent
Baick et al.

(10) Patent No.: US 12,266,138 B2
(45) Date of Patent: *Apr. 1, 2025

(54) METHOD OF PROVIDING IMAGE STORAGE SERVICE, RECORDING MEDIUM AND COMPUTING DEVICE

(71) Applicant: LINE Plus Corporation, Seongnam-si (KR)

(72) Inventors: Joon Sick Baick, Seongnam-si (KR); Seung Hoon Baek, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 35 days.

This patent is subject to a terminal disclaimer.

(21) Appl. No.: 18/161,299

(22) Filed: Jan. 30, 2023

(65) Prior Publication Data

US 2023/0169691 A1    Jun. 1, 2023

Related U.S. Application Data

(63) Continuation of application No. 17/116,252, filed on Dec. 9, 2020, now Pat. No. 11,593,966.

(30) Foreign Application Priority Data

Dec. 20, 2019   (KR) .......................... 10-2019-0171962

(51) Int. Cl.
| | |
|---|---|
| *G06T 7/00* | (2017.01) |
| *G06T 7/11* | (2017.01) |
| *G06T 9/00* | (2006.01) |

(52) U.S. Cl.
CPC .............. *G06T 9/00* (2013.01); *G06T 7/0002* (2013.01); *G06T 7/11* (2017.01); *G06T 2207/20021* (2013.01); *G06T 2207/30168* (2013.01)

(58) Field of Classification Search
CPC ...... H04N 19/40; H04N 19/124; H04N 19/61; G06F 3/0608; G06F 16/48
See application file for complete search history.

(56) References Cited

U.S. PATENT DOCUMENTS

| | | |
|---|---|---|
| 2008/0043831 A1 | 2/2008 | Sethuraman et al. |
| 2010/0118982 A1 | 5/2010 | Chatterjee et al. |
| (Continued) | | |

FOREIGN PATENT DOCUMENTS

| | | |
|---|---|---|
| CN | 1954611 A | 4/2007 |
| JP | H 06-334988 A | 12/1994 |
| (Continued) | | |

OTHER PUBLICATIONS

Huang, Jiun-Long, Ming-Syan Chen, and Hao-Ping Hung. "A QoS-aware transcoding proxy using on-demand data broadcasting." IEEE Infocom 2004. vol. 3. IEEE, 2004.*

(Continued)

*Primary Examiner* — Li Liu
(74) *Attorney, Agent, or Firm* — Harness, Dickey & Pierce, P.L.C.

(57) ABSTRACT

Disclosed herein are methods of providing an image storage service, computer-readable recording mediums, and/or computing devices. The method of providing the image storage service includes selecting image data in a first format, determining an initial compression parameter for converting the selected image data in the first format into a second format, obtaining primary image data in the second format by transcoding the selected image data in the first format based on the initial compression parameter, searching for a desired compression parameter based on whether image quality of the primary image data satisfies a criterion, obtaining final image data in the second format by transcoding the selected image data in the first format based on the (Continued)

desired compression parameter, and storing final image data in the second format in the memory.

20 Claims, 5 Drawing Sheets

(56) References Cited

U.S. PATENT DOCUMENTS

| | | |
|---|---|---|
| 2010/0138417 A1 | 6/2010 | Ma et al. |
| 2012/0201476 A1 | 8/2012 | Carmel et al. |
| 2016/0171676 A1* | 6/2016 | Kruglick .............. G06F 3/1415 345/428 |
| 2018/0084280 A1 | 3/2018 | Thiagarajan et al. |
| 2020/0341859 A1 | 10/2020 | Masuda et al. |
| 2021/0132861 A1 | 5/2021 | Liu et al. |

FOREIGN PATENT DOCUMENTS

| | | |
|---|---|---|
| JP | H 07-184062 A | 7/1995 |
| JP | 2005-288157 A | 10/2005 |
| JP | 2009-043294 A | 2/2009 |
| JP | 2009-105876 A | 5/2009 |
| JP | 2009-296382 A | 12/2009 |
| JP | 2010-129083 A | 6/2010 |
| JP | 2013-507083 A | 2/2013 |
| JP | 2014-165791 A | 9/2014 |
| KR | 10-2010-0062007 A | 6/2010 |
| KR | 10-1470404 B1 | 9/2014 |
| KR | 10-1540217 B1 | 7/2015 |

OTHER PUBLICATIONS

G. Alatorre et al. 'On Selective Compression of Primary Data' 11th International Conference on Network and Service Management (CNSM), 2015, pp. 187-191, doI: 10.1109/CNSM.2015.7367358.
S. Agarwala et al. 'iCostale: Adaptive Cost Optimization for Storage Clouds' IEEE 4th International Conference on Cloud Computing, 2011, pp. 436-443, doi: 10.1109/CLOUD.2011.88.
Japanese Office Action dated Dec. 3, 2024 issued in Japanese Patent Application No. 2020-210482.

* cited by examiner

METHOD OF PROVIDING IMAGE STORAGE SERVICE, RECORDING MEDIUM AND COMPUTING DEVICE

CROSS REFERENCE TO RELATED APPLICATION

This is a continuation of U.S. Application No. 17/116,252, filed Dec. 9, 2020, which claims priority to Korean Application No. 10-2019-0171962 filed Dec. 20, 2019, the disclosures of each of which are hereby incorporated by reference in their entirety.

BACKGROUND

1. Field

The present disclosure relates to methods of providing an image storage service that are performed by a computing device, recording mediums, and/or computing devices. More specifically, the present disclosure relates to methods of providing an image storage service that are capable of efficiently managing and providing user's image data stored in a storage space of a server to the user, computer-readable recording mediums having recorded thereon a program capable of executing the method on a computing device, and/or computing devices for performing the method.

2. Description of the Related Art

Recently, a cloud storage-based image storage service for storing image data of a user in a storage space of a server and transmitting the image data stored in the server to the user according to a user's request has been provided by a plurality of service providers.

As the number of users who use image storage services has increased and image-shooting devices have been generalized, a vast amount of image data is continuously stored in the storage space of the server. On the other hand, the image data stored in server is seldom deleted. Accordingly, there is a need for a method of efficiently managing the storage space of the server.

SUMMARY

Some example embodiments of the present disclosure provide methods of providing an image storage service, which is capable of efficiently managing a storage space of a server for storing image data of a user.

Some example embodiments of the present disclosure provide computing devices for performing the method of providing the image storage service.

Some example embodiments of the present disclosure provide computer-readable recording mediums having recorded thereon a program for executing the method of providing the image storage service.

The technical problems solved by example embodiments are not limited to the above technical problems. Other technical problems solved by the example embodiments but are not described herein will be clearly understood by a person (hereinafter referred to as an ordinary technician) having ordinary skill in the technical field, to which the present disclosure belongs, from the following description.

According to an example embodiments, a method of providing an image storage service, performed by a computing device including at least one processor and a memory, includes selecting image data in a first format, determining an initial compression parameter for converting the selected image data in the first format into a second format, obtaining primary image data in the second format by transcoding the selected image data in the first format based on the initial compression parameter, searching for a desired compression parameter based on whether image quality of the primary image data satisfies a criterion, obtaining final image data in the second format by transcoding the selected image data in the first format based on the desired compression parameter, and storing the final image data in the second format in the memory.

In the method, the selecting the image data in the first format may include selecting one of at least one first format data stored in the memory for a threshold period equal to or greater than a period, as the image data in the first format.

In the method, the determining the initial compression parameter may include determining the initial compression parameter based on a statistical value of one or more compression parameters used for previous transcoding.

In the method, the searching for the desired compression parameter may include adjusting the initial compression parameter to obtain an adjusted compression parameter, in response to the image quality of the primary image data satisfying the criterion, obtaining secondary image data in the second format by transcoding the image data in the first format based on the adjusted compression parameter, determining whether image quality of the secondary image data satisfies the criterion, and determining the initial compression parameter as the desired compression parameter, in response to the image quality of the secondary image data not satisfying the criterion, wherein the adjusted compression parameter may have a higher compression rate than the initial compression parameter.

In the method, the searching for the desired compression parameter may include adjusting the initial compression parameter to obtain an adjusted compression parameter, in response to the image quality of the primary image data not satisfying the criterion, obtaining secondary image data in the second format by transcoding the image data in the first format based on the adjusted compression parameter, determining whether image quality of the secondary image data satisfies the criterion, and determining the adjusted compression parameter as the desired compression parameter, in response to the image quality of the secondary image data satisfying the criterion, wherein the adjusted compression parameter may have a lower compression rate than the initial compression parameter.

In the method, whether the image quality of the primary image data satisfies the criterion may be determined based on whether a value associated with a difference between the image quality of the selected image data in the first format and the image quality of the primary image data in the second format is equal to or less than a threshold.

The method may further include dividing an image of the selected image data in the first format and an image of the primary image data in the second format into tiles each having a respective size, and determining whether the value associated with the difference between the image quality of the selected image data in the first format and the image quality of the primary image data in the second format is equal to or less than the threshold for at least some of the files.

The method may further include designating an object to be analyzed in an image of the selected image data in the first format and an image of the primary image data in the second format using a window having a size, and determining whether the value associated with the difference between the image quality of the selected image data in the first format and the image quality of the primary image data in the second format is equal to or less than the threshold while moving the window.

The method may further include receiving the image data in the first format from a terminal as data to be stored, receiving, from the terminal, an input requesting transmission of the data, determining whether the terminal is configured to support the second format, and transmitting the final image data in the second format in response to the terminal being configured to support the second format.

The method may further include receiving the image data in the first format from a terminal as data to be stored, receiving, from the terminal, an input requesting transmission of the data, determining whether the terminal is configured to support the second format, and transcoding the final image data in the second format into reconstructed image data in the first format and then transmitting the reconstructed image data in the first format, in response to the terminal does being configured to not support the second format.

In the method, the final image data in the second format may include reconstruction information of the image data in the first format, and reconstruction information of the image data in the first format may be used to transcode the final image data in the second format into the reconstructed image data in the first format.

In the method, the reconstruction information of the image data in the first format may include at least one of information on a quantization matrix of the first format, information on a size of an image in the first format, or sample aspect ratio (SAR) information of the first format.

According to an example embodiment, a computing device includes a memory configured to store computer-readable instructions and at least one processor configured to execute the computer-readable instructions such that the computing device is configured to select image data in a first format, determine an initial compression parameter for converting the selected image data in the first format into a second format, obtaining primary image data in the second format by transcoding the selected image data in the first format based on the initial compression parameter, search for a desired compression parameter based on whether image quality of the primary image data satisfies a criterion, obtaining final image data in the second format by transcoding the selected image data in the first format based on the desired compression parameter, and store the final image data in the second format in the memory.

The computing device may be further configured to adjust the initial compression parameter to obtain an adjusted compression parameter, in response to the image quality of the primary image data satisfying the criterion, obtain secondary image data in the second format by transcoding the image data in the first format based on the adjusted compression parameter, determine whether image quality of the secondary image data satisfies the criterion, and determine the initial compression parameter as the desired compression parameter, in response to the image quality of the secondary image data not satisfying the criterion, wherein the adjusted compression parameter may have a higher compression rate than the initial compression parameter.

The computing device may be further configured to adjust the initial compression parameter to obtain an adjusted compression parameter, in response to the image quality of the primary image data not satisfying the criterion, obtain secondary image data in the second format by transcoding the image data in the first format based on the adjusted compression parameter, determine whether image quality of the secondary image data satisfies the criterion, and determine the adjusted compression parameter as the desired compression parameter, in response to the image quality of the secondary image data satisfying the predetermined criterion, wherein the adjusted compression parameter may have a lower compression rate than the initial compression parameter.

The computing device is configured to determine whether the image quality of the primary image data satisfies the criterion based on whether a value associated with a difference between the image quality of the selected image data in the first format and the image quality of the primary image data in the second format is equal to or less than a threshold.

The computing device is further configured to divide an image of the selected image data in the first format and an image of the primary image data in the second format into tiles each having a respective size, and determine whether the value associated with the difference between the image quality of the selected image data in the first format and the image quality of the primary image data in the second format is equal to or less than the threshold for at least some of the tiles.

The computing device is further configured to designate an object to be analyzed in an image of the selected image data in the first format and an image of the primary image data in the second format using a window having a size, and determine whether the value associated with the difference between the image quality of the selected image data in the first format and the image quality of the primary image data in the second format is equal to or less than the threshold while moving the window.

The computing device may be further configured to receive the image data in the first format from a terminal as data to be stored, receive, from the terminal, an input requesting transmission of the data to be stored, determine whether the terminal is configured to support the second format, transmit the final image data in the second format, in response to the terminal being configured to support the second format, and transcode the final image data in the second format into reconstructed image data in the first format and then transmitting the reconstructed image data in the first format, in response to the terminal being configured to not support the second format.

According to an example embodiment, there is provided a non-transitory computer-readable recording medium having recorded thereon a program for execution by at least one processor that when executed by the at least one processor causes the at least one processor to execute the aforementioned method of providing an image storage service.

According to some example embodiments, it is possible to provide a method of providing an image storage service, which is capable of efficiently managing a storage space of a server for storing image data of a user.

According to some example embodiments, it is possible to provide a computing device for performing the method of providing the image storage service.

According to some example embodiments, it is possible to provide a non-transitory computer-readable recording medium having recorded thereon a program for executing the method of providing the image storage service.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, example embodiments of the present disclosure will be described in detail with reference to the accompanying drawings to the extent that the present disclosure can be easily carried out by those skilled in the art. However, the present disclosure may be embodied in various forms and should not be construed as being limited to the example embodiments described herein.

In describing the example embodiments, well-known functions or constructions will not be described in detail when it is determined that they may obscure the spirit of the present disclosure. Further, components not associated with the present disclosure are not shown in the drawings and like reference numerals are given to like components.

It is to be understood in the following description that when one component is referred to as being "connected to", "combined with", or "coupled to" another component, the expression may include not only direct connection but also indirect connection between the components. It will be further understood that when a component "comprises" or "has" another component, it means that the component may further include another component, not excluding another component unless stated otherwise.

It will be understood that, although the terms "first", "second", etc. may be used herein to describe various components, these components should not be limited by these terms. These terms are only used to distinguish one component from another component. Accordingly, within the description of the present disclosure, a first component in one embodiment may be referred to as a second component in another embodiment, and likewise a second component in one embodiment may be referred to as a first component in another embodiment.

In the following description, components are discriminated from each other to clearly describe their characteristics, but it does not mean that they are necessarily physically separated. That is, a plurality of components may be integrated in one hardware or software module and one component may be divided into a plurality of hardware or software modules. Accordingly, an integrated form of different components or divided forms of one component fall within the scope of the present disclosure even though not specifically stated.

In the following description, components described in various embodiments may not be all necessarily required but some components may be optional. Accordingly, an embodiment composed of a subset of the components included in an arbitrary embodiment also falls within the scope of the present disclosure. Further, an embodiment resulting from adding at least one component to a certain embodiment described above also falls within the scope of the present disclosure.

In addition, in this specification, the term "network" is a concept including both cable networks and wireless networks. The network refers to a communication network through which data can be exchanged between a device and a system or between devices and is not limited to a specific network.

In the present specification, the device may be a stationary device such as a home appliance equipped with a personal computer (PC) function or a display function or may be a mobile device such as a smartphone, a tablet PC, a wearable device, and a head mounted display (HMD) device. Alternatively, the device may be a computing device, a vehicle, or an Internet of Things (IoT) device each of which is operable as a server. That is, in the present specification, the device refers to any kind of device capable of performing a method of providing image storage service of the present invention and is not limited to a specific type.

In addition, in this specification, the term "image" refers to all kinds of media content that a user can view from a display unit of a user device (e.g., client device). That is, examples of the image include a still image, a moving image (also called video), and a stream of media content.

Configuration of System and Device

Figure 1:
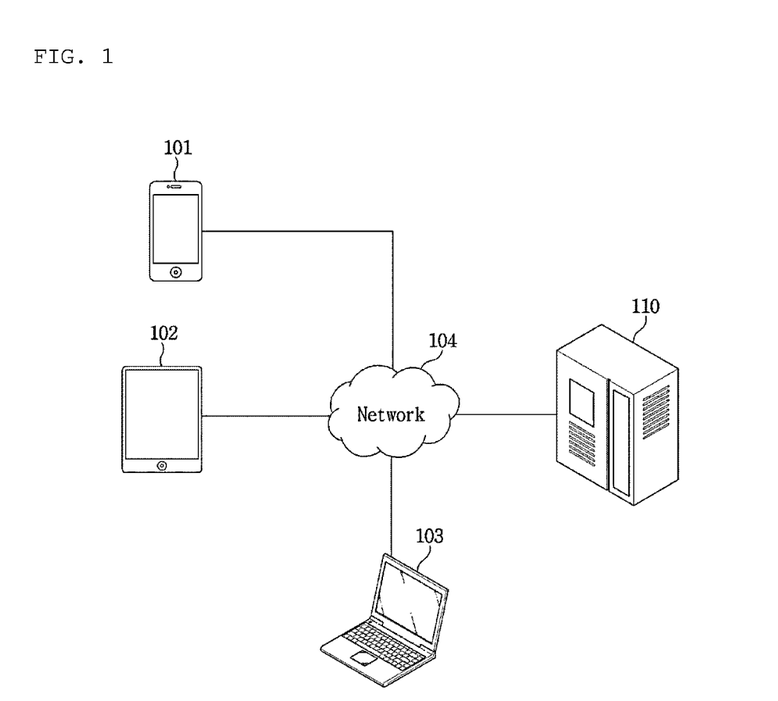
FIG. 1 is a view showing an example of a system in which an image storage service according to an example embodiment is performed.

FIG. 1 is a view showing an example of a system in which an image storage service according to an example embodiment is performed.

The image storage service according to an example embodiment may be performed in the system including one or more user devices 101, 102 and 103 and a server 110 connected via a network 104.

The user devices 101, 102 and 103 may be referred to as clients, terminals or user terminals, and may access the server 110 via the network 104 to transmit and receive data to and from other user devices or the server. The user devices and/or the server may be implemented as a computing device.

In each of the user devices 101, 102 and 103, a client module for utilizing the image storage service may be installed. Further, a server module for providing the image storage service may be installed in the server 110.

A user who uses the image storage service may access the server 110 for providing the service by inputting (or transmitting) desired (or alternatively, predetermined) access information (ID and password) through the user device. The server 110 may identify an accessing user using access information input (received) from the user device. Further, the server 110 may collect, accumulate, store, and query information on the identified users and support data transmission/reception between the identified users.

Figure 2A:
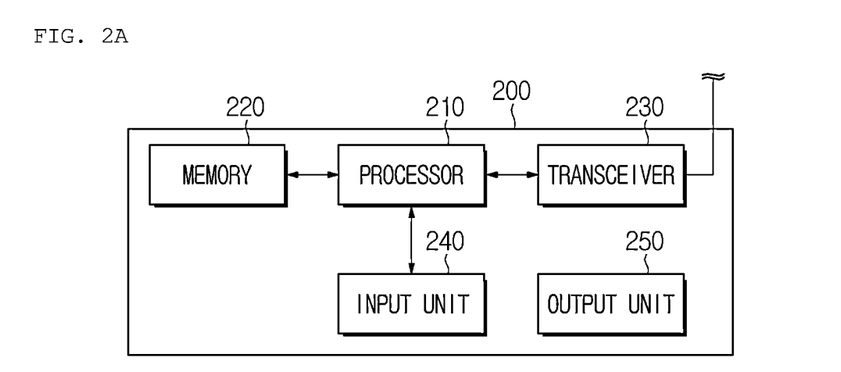
FIGS. 2A and 2B are a block diagram showing the configuration of a user device for using an image storage service according to an example embodiment and a server for providing an image storage service according to an example embodiment.
Figure 2B:
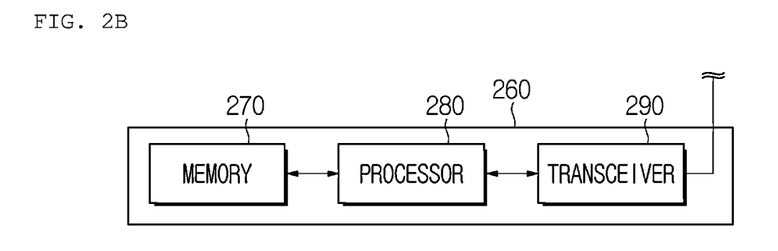

FIGS. 2A and 2B are a block diagram showing the configuration of a user device for using an image storage service according to an example embodiment and a server for providing an image storage service according to an example embodiment.

Referring to FIG. 2A, a user device 200 may include a processor 210, a memory 220, a transceiver 230, an input unit 240 and an output unit 250. The user device 200 may further include another component related to operation and function of the device, and thus is not limited to the above-described example embodiment. For example, the user device 200 may further include a image-shooting unit (not shown) for obtaining image data.

In the present disclosure, the image data may mean encoded data or bitstream obtained by encoding an image. In some example embodiments, the image data may mean an image itself. The image data may be stored or transmitted in the form of the encoded data or bitstream. The image data may be output in the form of a reconstructed image by decoding the encoded data or bitstream. Comparison or verification of the quality of images may be performed with respect to the images reconstructed by decoding the encoded data or bitstream.

Further, in the present disclosure, the image may include not only a still image but also a moving image composed of a plurality of still images. Further, the image may include not only an image of a progressive scanning method but also an image of an interlaced scanning method.

The processor 210 may control operation of the other components in the user device 200. For example, the processor 210 may process information obtained via the input unit 240, the transceiver 230 and the image-shooting unit (not shown). In addition, the processor 210 may read and process the information stored in the memory 220. The processor 210 may output the processed information through the output unit 250, store the processed information in the memory 220, or transmit the processed information to the outside through the transceiver 230.

For example, the processor 210 may receive the image data through the input unit 240 or the transceiver 230, obtain the image data through the image-shooting unit, or read the image data from the memory 220. Further, the processor 210 may store the image data in the memory 220, transmit the image data to the outside through the transceiver 230, or output the image data through the output unit 250. For example, in order to use the image storage service according to an example embodiment, the processor 210 may transmit the image data to a server 260 through the transceiver 230.

For example, when the request of the user is received through the input unit 240, the processor 210 may control operation of the other components to process the request of the user. For example, in order to use the image storage service according to an example embodiment, the user may request specific image data through the input unit 240. The processor 210 may receive the request and transmit information on the requested specific image data and/or information on the user device to the server 260 through the transceiver 230. Further, when the specific image data is received from the server 260, the processor 210 may store the image data in the memory 220, output the image data through the output unit 250, or transmit the image data to the outside through the transceiver 230. The information on the specific image data may include information capable of identifying the image data. The information on the user device may include information on a function (e.g., a function for reproducing an image in a specific format) supported by the user device.

The memory 220 may store information obtained from the outside of the user device, such as information received from the server 110 or another user device through the transceiver 230, information obtained through the input unit 240 of the user device or information obtained by the image-shooting unit of the user device. Further, the memory 220 may store information generated in the user device 200. For example, the memory 220 may include a database. The memory 220 may include all types of recording media capable of storing data. In the present disclosure, the memory 220 may be referred to as a storage.

The transceiver 230 may exchange data with the server 110 or another user device via a network. The transceiver 230 may include all types of wired/wireless communication modules capable of communicating with the outside.

The input unit 240 may include an input part implemented by various sensors, mechanical buttons, etc. provided in the user device 200. The user device 200 may include, for example, an input part (e.g., a virtual keyboard displayed on a touchscreen) using a pressure sensor or a capacitive touch sensor or a mechanical button as the input unit 240. The user device 200 may obtain information detected by the sensor or input of the mechanical button as input information.

The output unit 250 may output information obtained or received by the user device 200, information processed by the user device 200, etc. to the outside. The output unit 250 may include, for example, a display for outputting visual information.

The image-shooting unit may include all types of image-shooting parts capable of obtaining a still image or a moving image. For example, the image-shooting unit may be a camera module provided in a smartphone.

Referring to FIG. 2B, the server 260 may include a processor 280, a memory 270 and a transceiver 290. The server 260 may further include other components related to operation of the server or the system, and thus is not limited to the above-described example embodiment.

The processor 280 may control operation of the other components in the server 260. For example, the processor 280 may process information obtained through the transceiver 290. Further, the processor 280 may read and process information stored in the memory 270. The processor 280 may store the processed information in the memory 270 or transmit the processed information to the outside through the transceiver 290.

The processor 280 may perform the method of providing the image storage service according to the present disclosure. For example, the processor 280 may store the image data received from a user device through the transceiver 290 in the memory 270 to provide the image storage service according to an example embodiment. Further, the processor 280 may read the image data stored in the memory 270 according to a desired (or alternatively, predetermined) criterion, transcode the read image data, and store the transcoded image data in the memory 270. The processor 280 may compare the image quality of the image data read from the memory 270 with the image quality of the transcoded image data. When a result of image quality comparison satisfies the desired (or alternatively, predetermined) criterion, the processor 280 may store the transcoded image data in the memory 270. At this time, the image data read from the memory 270 may be deleted from the memory 270. In the present disclosure, the memory 270 may be referred to as a storage.

Further, the processor 280 may receive a request for specific image data and/or information on the user device from a user device through the transceiver 290 and read the specific image data from the memory 270. The processor 280 may transmit the read specific image data to the user device through the transceiver 290. At this time, the processor 280 may transcode the read specific image data based on the information on the user device and transmit the transcoded specific image data.

The memory 270 stores information received from the outside through the transceiver 290. Further, the memory 270 may store information generated in the server 260. For example, the image data transcoded according to the method of providing the image storage service according to some example embodiments may be stored in the memory 270. For example, the memory 270 may include a database. The memory 270 may include all types of storage media capable of storing data. In the present disclosure, the memory 270 may be referred to as a storage.

The transceiver 290 may exchange data with a user device or another server connected to the network. The transceiver 290 may include all types of wired/wireless communication modules capable of communicating with the outside.

The user device and/or the server of the present disclosure may be an example of a computing apparatus or a computing device.

Transcoding

In order to perform the method of providing the image storage service according to some example embodiments, image data may be transcoded. For example, image data in a first format may be transcoded into image data in a second format.

In the present disclosure, the format may mean a compression format of an image. That is, the format may mean a compression method used to compress an image. The first format and the second format may mean different compression methods. Further, transcoding may mean converting image data compressed in the first format into the second format and compressing the converted image data. Transcoding may be performed by decoding the image data in the first format to reconstruct an image and compressing the reconstructed image using another compression method to generate image data in the second format. Here, the compression method may mean a codec.

In the present disclosure, first format data may mean data in a first format or image data in a first format. Further, second format data may mean data in a second format or image data in a second format.

For example, the first format may mean a format in which an image is compressed using a codec relatively low compression efficiency, and the second format may mean a format in which an image is compressed using a codec having relatively high compression efficiency. Accordingly, for the same image, the amount of image data in the first format may be greater than the amount of image data in the second format.

Figure 3:
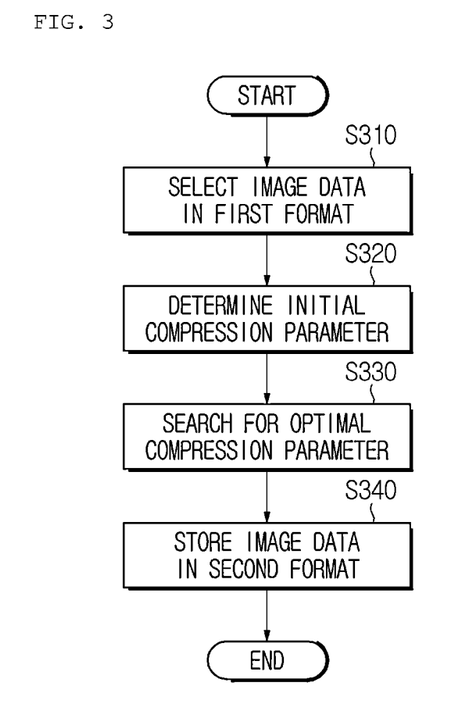
FIG. 3 is a view illustrating a transcoding method according to an example embodiment.

FIG. 3 is a view illustrating a transcoding method according to an example embodiment.

The transcoding method of FIG. 3 may be, for example, performed by the processor 280 of the server 260 for performing the method of providing the image storage service according to an example embodiment.

The transcoding method according to an example embodiment of the present disclosure may include operation S310 of selecting image data in a first format, operation S320 of determining an initial compression parameter, operation S330 of searching for an optimal compression parameter (or a desired compression parameter), and operation S340 of storing image data in a second format. Throughout the present disclosure, the term "optimal compression parameter" is used to refer not only to "optimal compression parameter" but also to "desired compression parameters."

According to the transcoding method of an example embodiment, the image data in the first format to be transcoded may be selected (S310).

The image data in the first format to be transcoded may be selected using various methods. For example, the image data in the first format received from the outside through the transceiver may be selected as an object to be transcoded. In some example embodiments, the image data in the first format read from the memory may be selected as an object to be transcoded. In some example embodiments, one of one or more image data in the first format stored in the memory may be selected as an object to be transcoded.

For example, a user may transmit (upload) the obtained image data in the first format to the server. The transmitted image data in the first format may be stored in the memory of the server as first format data. One or more first format data (e.g., the image data in the first format) may be stored in the memory of the server. The user may receive specific image data from the memory of the server, by requesting transmission of the specific image data from the server.

According to analyzing statistical analysis of inputs from a respective user requesting the image data stored in the server, the user tends to frequently request the image data within a desired (or alternatively, predetermined) period after the user uploaded the image data to the server, and the user's request for the image data tends to rapidly decrease after the desired (or alternatively, predetermined) period.

When the image data in the first format to be transcoded is selected from the memory, the above-described statistical analysis result may be considered. That is, the image data in the first format stored in the memory for a period equal to or greater than the desired (or alternatively, predetermined) period may be selected as an object to be transcoded. When the image data in the first format, which is expected to be less requested (e.g., less frequently requested) by the user, is transcoded into the image data in the second format having higher compression efficiency, the amount of image data decreases and thus the memory of the server may be efficiently used. Further, the image data in the first format, which is expected to be more requested (e.g., more frequently requested) by the user, may be stored without being transcoded to rapidly respond to the user's request.

When the image data in the first format to be transcoded is selected, the initial compression parameter for transcoding the selected image data in the first format into the second format may be determined (S320).

Because transcoding transforms the image data in the first format into the image data in the second format, in the description of FIG. 3, the compression parameter may be a parameter for performing compression according to the compression method of the second format. For example, the compression parameter may be related to the image quality of the compressed image or a compression rate. For example, the compression parameter may be related to quantization. For example, the parameter related to quantization may be a quantization matrix, a quantization step size, or the like. The parameter related to quantization may affect the compression rate and the image quality of the compressed image. For example, when the quantization step size is large, the compression rate increases but the image quality of the compressed image decreases. In contrast, when the quantization step size is small, the compression rate decreases, but the image quality of the compressed image is improved. That is, the compression parameter may include a quality factor.

The image data in n the second format generated by transcoding may be stored in the memory in place of the image data in the first format. Accordingly, the image quality of the image data in the second format is desired to be equal to that of the image data in the first format. In some example embodiment, the qualities of the two image data may be desired to be similar enough for the user not to recognize a difference in image quality between the two image data. That is, the image quality of the image data in the second format is desired to satisfy a desired (or alternatively, predetermined) criterion. Further, the amount of image data in the second format is desired to be as small as possible for an efficient use of the storage space of the server.

The compression parameter simultaneously satisfying the two requirements may be determined in operation S330 of searching for the optimal compression parameter. As described below, in the operation of searching for the optimal compression parameter, a process of performing transcoding while adjusting the compression parameter is repeatedly performed. Accordingly, the number of repetitions of the process may be reduced by appropriately selecting the initial compression parameter.

The initial compression parameter may be determined based on the statistical value of one or more compression parameters used previously. For example, the initial compression parameter may be determined using at least one of a maximum value, a minimum value, a median value, an average value, a weighted average value or a mode value of N compression parameters used previously. At this time, the N compression parameters may be N initial compression parameters or N optimal compression parameters. N may be an integer of 1 or more. In some example embodiments, an optimal compression parameter used immediately before may be determined as the initial compression parameter.

As another example embodiment of determining the initial compression parameter, information on the image data in the first format (e.g., attribute information) and information on a relationship of an optimal compression parameter for the image data (hereinafter referred to as relationship information) may be used. For example, when the optimal compression parameter for the image data in the first format is searched, the information on the image data in the first format and the relationship information of the relationship of the optimal compression parameter may be stored or learned. The relationship information may be cumulatively stored or learned. The learning may mean learning using machine learning. Thereafter, when the image data in the first format to be transcoded is selected, the initial compression parameter may be determined based on information on the selected image data in the first format and the relationship information. For example, the existing transcoded image data in the first format having attributes similar to those of the selected image data in the first format to be transcoded may be determined, and the optimal compression parameter applied to the existing image data may be determined as the initial compression parameter for current image data. In some example embodiments, the initial compression parameter may be determined by inputting information on the current image data to a machine learning-based learning model.

When the initial compression parameter is determined, the optimal compression parameter search process may be performed using the initial compression parameter (S330). As described above, the optimal compression parameter may mean a compression parameter for generating image data in a second format having a smallest amount of data while satisfying the desired image quality. A detailed description of the optimal compression parameter search process will be described later with reference to FIGS. 4 to 6B.

When the optimal compression parameter is determined, the image data in the second format transcoded using the optimal compression parameter may be stored (S340). For example, the image data in the second format may replace the image data in the first format. That is, the image data in the first format may be permanently deleted from the memory of the server and instead the image data in the second format may be stored in the memory.

In the present disclosure, the image data in the second format obtained by transcoding the image data in the first format based on the initial compression parameter may be referred to as primary image data in the second format. The image data in the second format obtained by transcoding the image data in the first format based on the adjusted compression parameter may be referred to as secondary image data in the second format. The image data in the second format obtained by transcoding the image data in the first format based on the optimal compression parameter may be referred to as final image data in the second format.

As described below, the image data in the second format may be transcoded into the image data in the first format again later. Transcoding may be performed by decoding the image data in the second format to reconstruct the image and then compressing the reconstructed image using a compression method of a first format. At this time, the image data in the first format generated by transcoding the image data in the second format is desired to be as similar as possible to original image data in the first format selected in operation S310. Accordingly, it is desirable to store reconstruction information of the image data in the first format in advance.

Figure 7:
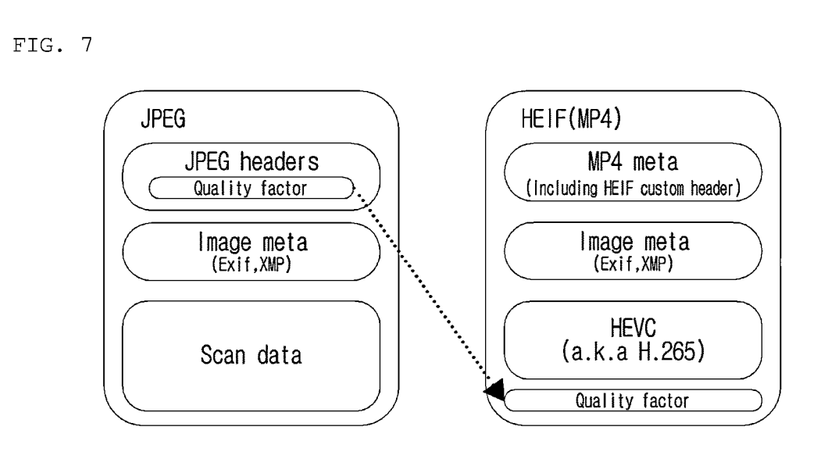
FIG. 7 is a view showing an example of storing reconstruction information of image data in a first format.

FIG. 7 is a view showing an example of storing reconstruction information of image data in a first format.

In the example shown in FIG. 7, JPEG means the compression method of the first format and HEIF means the compression method of the second format.

By the transcoding method according to an example embodiment, image data in a JPEG format may be transcoded into image data in a HEIF format. Thereafter, the image data in the JPEG format may be permanently deleted from the memory.

In the example shown in FIG. 7, the image data in the JPEG format may include a header (JPEG headers), metadata (Image meta) and actual image data (Scan data). The header and/or the metadata may include information on the image and/or information desired to decode the image. For example, the header and/or the metadata may include a quality factor. Further, the header and/or the metadata may include information on the size of the image (width and height), a sample aspect ratio (SAR), etc.

In the example shown in FIG. 7, the image data in the HEIF format include a header (MP4 meta), image metadata (Image metadata) and actual image data (HEVC data). According to an example embodiment, the reconstruction information of the image data in the first format may be included and stored in the image data in the second format. For example, when the image data in the second format is decoded, the reconstruction information may be included in a region that is not referenced by a decoder. For example, the region including the reconstruction information may be expressed by a comment header or custom header of the image data in the second format.

In the example shown in FIG. 7, the quality factor of the JPEG format is stored in the image data in the HEIF format as the reconstruction information. However, example embodiments are not limited thereto, and the reconstruction information may include the information stored in the header and/or metadata of the JPEG format, such as information on the size of the image or a sample aspect ratio.

In operation S340, the image data in the second format is stored. At this time, the above-described reconstruction information may be stored together as a portion of the image data in the second format. Detailed use of the stored reconstruction information will be described later with reference to FIG. 8.

Search of Optimal Compression Parameter

Figure 4:
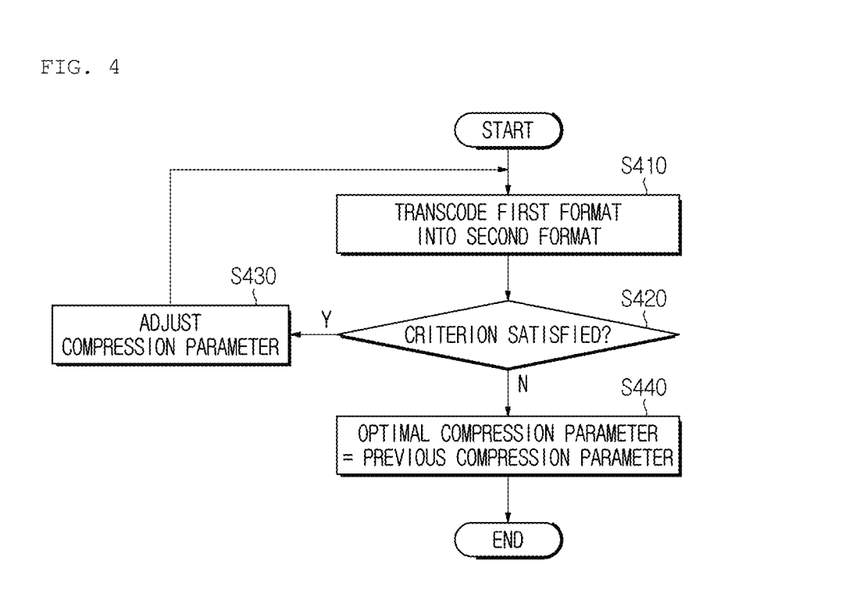
FIG. 4 is a view illustrating an example of a search process of an optimal compression parameter.

FIG. 4 is a view illustrating an example of a search process of an optimal compression parameter.

In the example shown in FIG. 4, the image quality of the image data in the second format transcoded based on the initial compression parameter satisfies a desired (or alternatively, predetermined) criterion.

The search process of FIG. 4 may start using the initial compression parameter. That is, the image data in the first format may be transcoded into the image data in the second format based on the initial compression parameter (S410).

Whether the image quality of the image data in the second format generated by transcoding satisfies the desired (or alternatively, predetermined) criterion may be determined (S420). For example, when a difference in image quality between the image data in the first format and the image data in the second format is equal to or less than a desired (or alternatively, predetermined) threshold, it may be determined that the desired (or alternatively, predetermined) criterion is satisfied. A method of determining whether the quality of the image satisfies the desired (or alternatively, predetermined) criterion will be described later with reference to FIGS. 6A and 6B.

In the example of FIG. 4, because the quality of the image data in the second format transcoded based on the initial compression parameter satisfies the desired (or alternatively, predetermined) criterion, the initial compression parameter may be adjusted (S430). For example, the compression parameter may be adjusted in a direction in which a compression rate increases.

Thereafter, the above-described process may be repeated based on the adjusted compression parameter. When the image quality of the transcoded image data in the second format does not satisfy the desired (or alternatively, predetermined) criterion in operation S420, the process may move to operation S440.

In operation S440, the compression parameter immediately before a current compression parameter may be determined as the optimal compression parameter. The current compression parameter does not satisfy the desired (or alternatively, predetermined) criterion for the image quality and thus cannot become an optimal compression parameter. The previous compression parameter (compression parameter before adjustment) having a highest compression rate while satisfying the desired (or alternatively, predetermined) criterion for the image quality may be determined as the optimal compression parameter.

Figure 5:
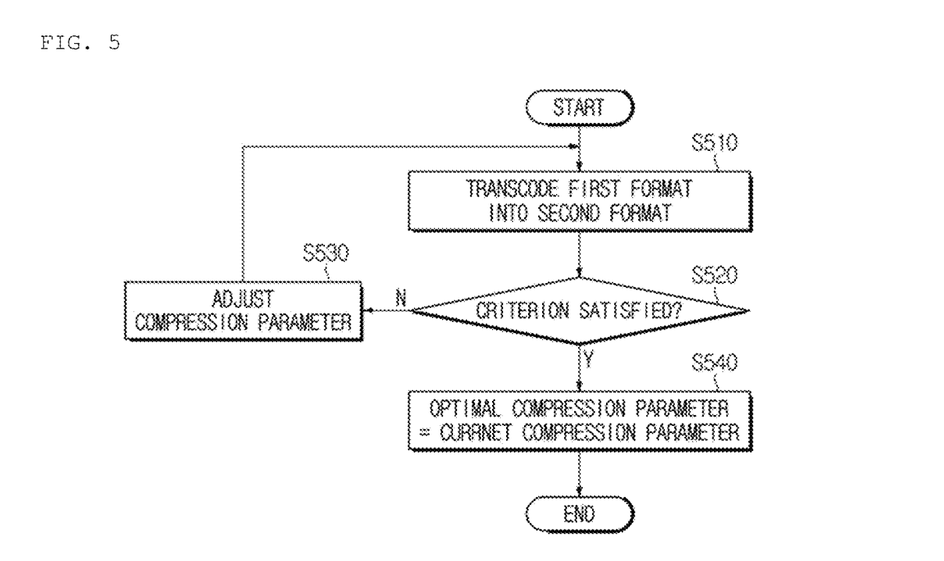
FIG. 5 is a view illustrating another example of a search process of an optimal compression parameter.

FIG. 5 is a view illustrating another example of a search process of an optimal compression parameter.

In the example shown in FIG. 5, the quality of the image data in the second format transcoded based on the initial compression parameter does not satisfy a desired (or alternatively, predetermined) criterion.

The search process of FIG. 5 may start using the initial compression parameter. That is, the image data in the first format may be transcoded into the image data in the second format based on the initial compression parameter (S510).

Whether the image quality of the image data in the second format generated by transcoding satisfies the desired (or alternatively, predetermined) criterion may be determined (S520). For example, when a difference in image quality between the image data in the first format and the image data in the second format is equal to or less than a desired (or alternatively, predetermined) threshold, it may be determined that the desired (or alternatively, predetermined) criterion is satisfied. A method of determining whether the quality of the image satisfies the desired (or alternatively, predetermined) criterion will be described later with reference to FIGS. 6A and 6B.

In the example of FIG. 5, since the image quality of the image data in the second format transcoded based on the initial compression parameter does not satisfy the desired (or alternatively, predetermined) criterion, the initial compression parameter may be adjusted (S530). For example, the compression parameter may be adjusted in a direction in which a compression rate decreases.

Thereafter, the above-described process may be repeated based on the adjusted compression parameter. When the image quality of the transcoded image data in the second format satisfies the desired (or alternatively, predetermined) criterion in operation S520, the process may move to operation S540.

In step S540, a current compression parameter may be determined as the optimal compression parameter. Thus, the optimal compression parameter (e.g., an adjusted compression parameter) has a lower compression rate than one or more previous compression parameters.

By the above-described method, it is possible to search for an optimal compression parameter having a highest compression rate while satisfying the desired (or alternatively, predetermined) criterion for image quality.

Determination of the adjustment width of the compression parameter may be performed similarly to determination of the initial compression parameter. For example, the adjustment width of the compression parameter may be determined based on a statistical value of one or more adjustment widths used previously. In some example embodiments, the adjustment width may be determined based on information on the image data in the first format (e.g., attribute information) and information on a relationship of the adjustment width.

In some example embodiments, the adjustment width of the compression parameter may be determined based on a difference in image quality between the image data in the first format and the transcoded image data in the second format. For example, when the difference is small, the adjustment width may be determined to be small and, when the difference is large, the adjustment width may be determined to be large.

A combination of one or more of the above-described methods may be applied in order to determine the adjustment width of the compression parameter.

In the example embodiments described with reference to FIGS. 4 and 5, adjustment of the compression parameter is performed only in one direction (in the direction in which the compression rate increases or in the direction in which the compression rate decreases). However, example embodiments are not limited thereto, and adjustment of the compression parameter may be performed in both directions.

For example, in the example embodiment described with reference to FIG. 4, when a first compression parameter satisfies the criterion of operation S420 and a second compression parameter obtained by adjusting the first compression parameter does not satisfy the criterion of operation S420, whether a third compression parameter obtained by adjusting the second compression parameter satisfies the criterion of operation S420 may be determined.

Similarly, in the example embodiment described with reference to FIG. 5, when the first compression parameter does not satisfy the criterion of operation S520 and the second compression parameter obtained by the adjusting the first compression parameter satisfies the criterion of operation S520, whether the third compression parameter obtained by adjusting the second compression parameter satisfies the criterion of operation S520 may be determined.

In the modified example in which the compression parameter is adjusted in both directions, the compression rate of the third compression parameter may be included between the compression rate of the first compression parameter and the compression rate of the second compression parameter. As described above, the optimal compression parameter may be determined by adjusting the compression parameter in both directions. At this time, the number of times of adjustment of the compression parameter may be predetermined. Additionally or alternatively, the optimal compression parameter may be searched using the search process of FIG. 4 and the search process of FIG. 5 together.

Image Quality Comparison

Figure 6A:
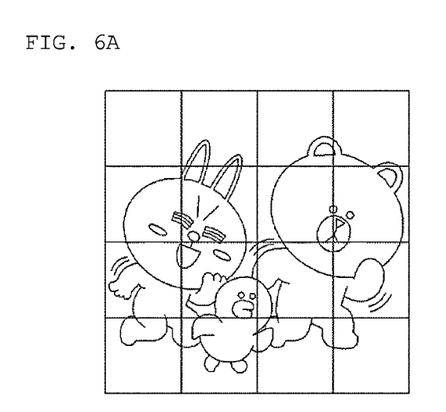
FIGS. 6A and 6B are views illustrating examples of a method of comparing image quality of image data in a first format with image quality of image data in a second format.
Figure 6B:
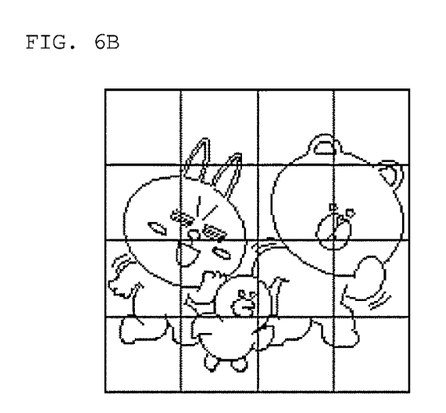

FIGS. 6A and 6B are views illustrating examples of a method of comparing image quality of image data in a first format with image quality of image data in a second format.

Comparison of image quality of two image data may be performed by comparing the image quality of two images reconstructed by decoding the two image data. Comparison of the image quality of images may be performed using a peak signal to noise ratio (PSNR) and/or structural similarity (SSIM) which are generally used image quality comparison metrics. However, example embodiments are not limited to the above example, and various image quality comparison methods may be used.

FIG. 6A may show a first image reconstructed by decoding the image data in the first format, and FIG. 6B may show a second image reconstructed by decoding the image data in the second format. Comparison between the first image and the second image may be performed in units of images. That is, whether a comparison result value (a difference value indicating a difference in image quality between two images) derived by performing comparison of image quality between the first image and the second image is equal to or less than a desired (or alternatively, predetermined) threshold may be determined. When the difference value is equal to or less than the desired (or alternatively, predetermined) threshold, it may be determined that the image quality of the transcoded image data in the second format satisfies the desired (or alternatively, predetermined) criterion in operation S420 or operation S520. When the difference value is greater than the desired (or alternatively, predetermined) threshold, it may be determined that the image quality of the transcoded image data in the second format does not satisfy the desired (or alternatively, predetermined) criterion.

For example, when PSNR and/or SSIM are performed with respect to the entire image, a value derived by PSNR and/or SSIM may be an average value of the entire image. Accordingly, in this case, accurate image quality comparison may not be performed. The image may include a simple region having little image information and a complex region having a lot of image information. For example, in FIGS. 6A and 6B, the top left region of the image may be a simple region that does not include an edge, and the middle region of the image may be a complex region including many edges. In this case, even if the difference value in image quality between the two images in the complex region is greater than the desired (or alternatively, predetermined) threshold, because there is almost no difference in image quality between the two images in the simple region, the average difference value of the entire image may be determined to be equal to or less than the desired (or alternatively, predetermined) threshold in step S420 of FIG. 4. That is, even if the desired (or alternatively, predetermined) image quality criterion is satisfied with respect to the entire image, the desired (or alternatively, predetermined) image quality criterion may not be partially satisfied. Accordingly, comparison of the image quality of the entire image as a unit may not be desirable.

In the example shown in FIGS. 6A and 6B, the image may be divided into tiles having a desired (or alternatively, predetermined) size. Further, comparison of image quality may be performed in units of tiles. For example, image quality comparison may be performed by applying PSNR and/or SSIM to the tiles of the image in the first format and the corresponding tiles of the image in the second format. Image quality comparison of each tile may be performed with respect to all tiles configuring the image. When the desired (or alternatively, predetermined) image quality criterion is satisfied for all tiles, it may be determined that the image quality of the transcoded image data in the second format satisfies the desired (or alternatively, predetermined) criterion. That is, when the desired (or alternatively, predetermined) image quality criterion is not satisfied even in one tile, it may be determined that the image quality of the image data in the second format does not satisfy the desired (or alternatively, predetermined) criterion. By performing image quality comparison of each tile configuring the image, it is possible to guarantee the image quality of the image data in the second format.

As another example embodiment, N tiles may be selected among tiles obtained by dividing the image in order of high complexity and image quality comparison of each tile may be performed only with respect to the selected N tiles. This is because a probability that an image quality comparison result of a region having relatively low complexity satisfies the desired (or alternatively, predetermined) criterion is high, when an image quality comparison result of a region having relatively high complexity satisfies the desired (or alternatively, predetermined) criterion. At this time, N may be an integer of 1 or more. The size of the tile obtained by dividing the image may be predefined or may be adaptively determined based on information on the image. For example, when the size of the image is large, the desired (or alternatively, predetermined) size may be determined to be relatively large. For example, when a large number of simple regions is included in the image, the desired (or alternatively, predetermined) size may be determined to be relatively large.

In some example embodiments, one image may be divided into tiles having different sizes. For example, the simple region in the image may be divided into tiles having a large size and the complex region may be divided into tiles having a small size.

The shape of the tile divided from the image may be a rectangle having a size of M×N. At this time, M and N may be integers that are equal to or different from each other.

Method of dividing the image according to example embodiments are not limited to the above examples. For example, a simple region and a complex region may be extracted from the image based on the edge of an object included in the image. Image quality comparison may be performed with each of the simple region and the complex region. In some example embodiments, when the image quality comparison result of the complex region satisfies the desired (or alternatively, predetermined) criterion, because the image quality comparison result of the simple region is highly likely to satisfy the predetermined criterion, image quality comparison may be performed only with respect to the complex region. In some example embodiments, the complex region may be subdivided according to complexity. In this case, image quality comparison may be performed only with the N complex regions in order of high complexity. At this time, N may be an integer of 1 or more.

As another example embodiment, the image quality of the image data in the first format and the image quality of the image data in the second format may be compared using a sliding-window method. That is, the image qualities of window-corresponding portions of the image data in the first format and the image data in the second format may be compared while moving by an arbitrary amount of movement using a window for designating an object to be analyzed in the image. In other words, the value associated with the difference between the image quality of the image data in the first format and the image quality of the image data in the second format is equal to or less than a desired (or alternatively, predetermined) threshold while moving the window by an arbitrary amount.

At this time, the size of the window for designating the object to be analyzed may be predefined or may be adaptively determined based on information on the image of the image data in the first format. For example, when the size of the image is large, the size of the window may be determined to be relatively large. For example, when a large number of simple regions is included in the image, the size of the window may be determined to be relatively large.

The amount of movement of the window may be predefined or may be adaptively determined based on the information on the image. For example, the amount of movement in the simple region may be greater than the amount of movement in the complex region in the image.

The size of the window may be less than or equal to that of the image and the shape of the window may be a rectangle having a size of M×N. At this time, M and N may be integers equal to or different from each other.

Provision of Stored Image Data

Figure 8:
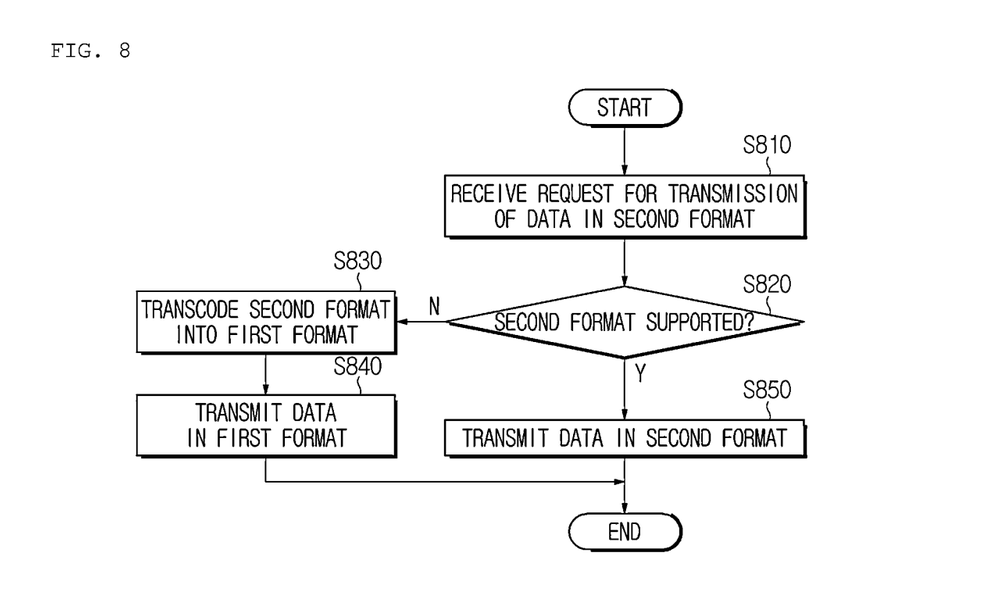
FIG. 8 is a view illustrating an example embodiment of providing image data stored in a memory according to a request of a user.

FIG. 8 is a view illustrating an example embodiment of providing image data stored in a memory according to a request from a user device.

A computing device (e.g., a server) for performing the method of providing the image storage service according to an example embodiment may receive image data from a user terminal and store the received image data in a memory as data to be stored. At this time, the image data may be an image data in a first format.

Further, the computing device according an example embodiment may receive user input for requesting transmission of image data stored in the memory from a terminal. The server may provide the image storage service by transmitting the requested image data to the user. The user's request may include information on specific image data and/or information on a user device. The information on the user device may include information on a function supported by the user device. For example, the information on the user device may include information on whether the image data in the second format is capable of being reconstructed.

The specific image data, transmission of which is requested by the user terminal, may be stored in the memory as the image data in the first format or may be transcoded into an image data in the second format after a desired (or alternatively, predetermined) period of time and then stored in the memory. When the specific image data requested by the user is stored as the image data in the first format, the server may provide the image storage service by transmitting the image data in the first format to the user device. Hereinafter, it is assumed that the specific image data requested by the user is transcoded into the image data in the second format and is stored.

When user input requesting transmission of the image data in the second format is received (S810), whether the user device is capable of reconstruct the image data in the second format (e.g., whether the user device supports a compression method of a second format) may be determined based on the information on the user device (S820).

When the user device supports the compression method of the second format, the image data in the second format may be read from the memory and transmitted to the user device (S850), thereby providing the image storage service.

When the user device does not support the compression method of the second format, the image data in the second format may be transcoded into the image data in the first format (S830). The image data in the first format obtained in operation S830 may be different from the image data in the first format, which is first (e.g., initially) received from the user terminal. Accordingly, the image data in the first format obtained in step S830 may be referred to as reconstructed image data in the first format.

The compression parameter for transcoding may be derived according to the example embodiments described with reference to FIGS. 3 to 5. In some example embodiments, as described with reference to FIG. 7, transcoding may be performed using reconstruction information of the image data in the first format stored in the image data in the second format. The reconstruction information may include a quality factor of the image data in the first format, information on the size of the image in the first format and/or a sample aspect ratio. By performing transcoding using the pre-stored reconstruction information, it is possible to perform transcoding without image quality comparison. By using the quality factor of the image data in the first format, the quality of the transcoded image in the first format may be the same as or substantially equal to that of an original image uploaded to the server by the user. Further, by using the size of the format in the first format and/or the sample aspect ratio, the size of the transcoded image in the first format may be equal to that of the original image. Accordingly, it is possible to prevent occurrence of undesirable excessive network traffic and to avoid a situation in which an image having a different size or shape from the original image is provided to the user.

The server may provide the image storage service by transmitting (S840) the image data in the first format obtained by transcoding to the user device.

According to the example embodiment described with reference to FIG. 8, when the user device does not support the compression method of the second format, the image data in the second format is transcoded into the image data in the first format and the transcoded image data in the first format is transmitted. However, example embodiments are not limited thereto. When the user device supports a compression method of a third format, the image data in the second format may be transcoded into image data in a third format and the transcoded image data in the third format may be transmitted. In this case, a compression parameter for transcoding into the third format may be derived according to the example embodiments described with reference to FIGS. 3 to 5. In some example embodiments, some of the reconstruction information stored in the image data in the second format may be used. For example, the size of the image in the first format and/or the sample aspect ratio may be used regardless of the format of the transcoded image. When the compression rate of the compression method of the third format is higher than that of the compression method of the first format, because the amount of image data transcoded using the compression method of the third format is less than that of image data transcoded using the compression method of the first format, it is possible to minimize network traffic.

According to the method of providing the image storage service of the present disclosure, a user may receive, from a server, an image which has little image quality difference from a first uploaded image. Further, because image data is transcoded and stored using a high-efficiency compression method, the storage space of the server may be efficiently used. For example, because the compression rate of the HEIF method is more than twice that of the JPEG method, in some example embodiments, it is possible to reduce a space for storing the image data of the same image by 50% or less.

Although the example methods of the present disclosure are represented by a series of operations for clarity of description, example embodiments are not intended to limit the order in which the operations are performed. That is, if desired, each step may be performed in parallel or performed in series in a different order. The example embodiments described above can be modified such that some additional operations can be added to a corresponding example embodiment or some existing operations can be eliminated from a corresponding example embodiment.

The various example embodiments described above are not intended to represent all of the possible combinations according to technical spirit of the present disclosure, but are provided only for illustrative purposes. Elements, operations or steps described in the above various embodiments can be applied independently or in combination.

Methods according to example embodiments may be implemented with program instructions that can be executed by various computing devices, and can be recorded in a computer-readable recording medium. The computer-readable recording medium may store program instructions, data files, data structures, and the like solely or in combination. The program instructions recorded on the medium may be ones that are specifically designed and configured to carry out the present invention or may be publicly available to professionals in the field of computer software. Examples of the computer-readable recording medium include magnetic media such as hard disks, floppy disks, and magnetic tapes, optical media such as CD-ROMs and DVDs, magneto-optical media such as floptical disks, and hardware devices, which are specifically configured to store and execute program instructions, such as ROM, RAM, and flash memory. Examples of the program instruction include machine language codes generated by a compiler and high-level language codes that are generated by an interpreter, and can be executed by a computer. The hardware device described above may be configured to include at least one software module to perform a method according to an example embodiment, and vice versa.

Various example embodiments in the present disclosure can be implemented by hardware or a combination of hardware and software (e.g., firmware). When implemented by hardware, some example embodiments can be implemented by at least one application specific integrated circuit (ASIC), digital signal processor (DSP), digital signal processing device (DSPD), programmable logic device (PLD), field programmable gate array (FPGA), general processor, controller, micro controller, or micro-processor.

The scope of the present disclosure covers a non-transitory computer-readable medium in which software or machine-executable commands (e.g., operating systems (OSs), application programs, firmware, programs) that, when executed by a certain device or computer, enable the certain device or computer to perform operations according to various example embodiments are stored

What is claimed is:

1. A method of providing an image storage service performed by a computing device including at least one processor and a memory, the method comprising:
   selecting image data in a first format, the selecting including selecting the image data requested by a user at a frequency less than a reference number during a desired period among image data stored in the computing device, based on a statistical analysis result for the image data stored in the computing device;
   in response to the image data being selected based on the frequency and the reference number,
      determining an initial compression parameter for converting the selected image data in the first format into a second format;
      obtaining primary image data in the second format by transcoding the selected image data in the first format based on the initial compression parameter;
      searching for a desired compression parameter based on whether image quality of the primary image data satisfies a criterion;
      obtaining final image data in the second format by transcoding the selected image data in the first format based on the desired compression parameter; and
      storing the final image data in the second format in the memory.

2. The method of claim 1, wherein the selecting the image data among image data stored in the computing device includes selecting the image data based on a statistical analysis of inputs from a user requesting the image data stored in the computing device.

3. The method of claim 1, further comprising:
   determining whether the selected image data is expected to be less requested by a user or is less requested by the user, based on another criterion.

4. The method of claim 1, wherein the determining the initial compression parameter includes determining the initial compression parameter based on a statistical value of one or more compression parameters used for previous transcoding.

5. The method of claim 1, wherein the searching for the desired compression parameter comprises:
   adjusting the initial compression parameter to obtain an adjusted compression parameter, in response to the image quality of the primary image data satisfying the criterion;
   obtaining secondary image data in the second format by transcoding the image data in the first format based on the adjusted compression parameter;
   determining whether image quality of the secondary image data satisfies the criterion; and
   determining the initial compression parameter as the desired compression parameter, in response to the image quality of the secondary image data does not satisfying the criterion, wherein the adjusted compression parameter has a higher compression rate than the initial compression parameter.

6. The method of claim 1, wherein the searching for the desired compression parameter comprises:
adjusting the initial compression parameter to obtain an adjusted compression parameter, in response to the image quality of the primary image data not satisfying the criterion;
obtaining secondary image data in the second format by transcoding the image data in the first format based on the adjusted compression parameter;
determining whether image quality of the secondary image data satisfies the criterion; and
determining the adjusted compression parameter as the desired compression parameter, in response to the image quality of the secondary image data satisfying the criterion,
wherein the adjusted compression parameter has a lower compression rate than the initial compression parameter.

7. The method of claim 1, wherein whether the image quality of the primary image data satisfies the criterion is determined based on whether a value associated with a difference between the image quality of the selected image data in the first format and the image quality of the primary image data in the second format is equal to or less than a threshold.

8. The method of claim 7, further comprising:
dividing an image of the selected image data in the first format and an image of the primary image data in the second format into tiles each having a respective size; and
determining whether the value associated with the difference between the image quality of the selected image data in the first format and the image quality of the primary image data in the second format is equal to or less than the threshold, for at least some of the tiles.

9. The method of claim 7, further comprising:
designating an object to be analyzed in an image of the selected image data in the first format and an image of the primary image data in the second format using a window having a size; and
determining whether the value associated with the difference between the image quality of the selected image data in the first format and the image quality of the primary image data in the second format is equal to or less than the threshold while moving the window.

10. The method of claim 1, further comprising:
receiving the image data in the first format from a terminal as data to be stored;
receiving, from the terminal, an input requesting transmission of the data;
determining whether the terminal is configured to support the second format; and
transmitting the final image data in the second format in response to the terminal being configured to support the second format.

11. The method of claim 1, further comprising:
receiving the image data in the first format from a terminal as data to be stored;
receiving, from the terminal, an input requesting transmission of the data to be stored;
determining whether the terminal is configured to support the second format; and
transcoding the final image data in the second format into reconstructed image data in the first format and then transmitting the reconstructed image data in the first format, in response to the terminal being configured to not support the second format.

12. The method of claim 1, wherein
the final image data in the second format includes reconstruction information of the image data in the first format, and
the reconstruction information of the image data in the first format is used to transcode the final image data in the second format into a reconstructed image data in the first format.

13. The method of claim 12, wherein the reconstruction information of the image data in the first format includes at least one of information on a quantization matrix of the first format, information on a size of an image in the first format, or sample aspect ratio (SAR) information of the first format.

14. A non-transitory computer-readable recording medium having recorded thereon a program for execution by at least one processor that when executed by the at least one processor causes the at least one processor to execute a method of providing an image storage service, the method comprising:
selecting image data in a first format, the selecting including selecting the image data requested by a user at a frequency less than a reference number during a desired period among image data stored in a computing device including the at least one processor and a memory, based on a statistical analysis result for the image data stored in the computing device;
in response to the image data being selected based on the frequency and the reference number;
determining an initial compression parameter for converting the selected image data in the first format into a second format;
obtaining primary image data in the second format by transcoding the selected image data in the first format based on the initial compression parameter;
searching for a desired compression parameter based on whether image quality of the primary image data satisfies a criterion;
obtaining final image data in the second format by transcoding the selected image data in the first format based on the desired compression parameter; and
storing the final image data in the second format in the memory.

15. A computing device comprising:
a memory configured to store computer-readable instructions; and
at least one processor configured to execute the computer-readable instructions such that the computing device is configured to,
select image data in a first format requested by a user at a frequency less than a reference number during a desired period among image data stored in the computing device, based on a statistical analysis result for the image data stored in the computing device,
in response to the image data being selected based on the frequency and the reference number,
determine an initial compression parameter for converting the selected image data in the first format into a second format,
obtain primary image data in the second format by transcoding the selected image data in the first format based on the initial compression parameter, search for a desired compression parameter based on whether image quality of the primary image data satisfies a criterion, obtain final image data in the second format by transcoding the selected image data in the first format based on the desired compression parameter, and store the final image data in the second format in the memory.

16. The computing device of claim 15, wherein the computing device is further configured to select the image data among image data stored in the computing device by selecting the image data based on a statistical analysis of inputs from a user requesting the image data stored in the computing device.

17. The computing device of claim 15, wherein the computing device is further configured to determine whether the selected image data is expected to be less requested by a user or being less requested by the user, based on another criterion.

18. The computing device of claim 15, wherein the computing device is further configured to, adjust the initial compression parameter to obtain an adjusted compression parameter, in response to the image quality of the primary image data satisfying the criterion, obtain secondary image data in the second format by transcoding the image data in the first format based on the adjusted compression parameter, determine whether image quality of the secondary image data satisfies the criterion, and determine the initial compression parameter as the desired compression parameter, in response to the image quality of the secondary image data not satisfying the criterion, wherein the adjusted compression parameter has a higher compression rate than the initial compression parameter.

19. The computing device of claim 15, wherein the computing device is further configured to, adjust the initial compression parameter to obtain an adjusted compression parameter, in response to the image quality of the primary image data not satisfying the criterion, obtain secondary image data in the second format by transcoding the image data in the first format based on the adjusted compression parameter, determine whether image quality of the secondary image data satisfies the criterion, and determine the adjusted compression parameter as the desired compression parameter, in response to the image quality of the secondary image data satisfying the criterion, wherein the adjusted compression parameter has a lower compression rate than the initial compression parameter.

20. The computing device of claim 15, wherein the computing device is configured to determine whether the image quality of the primary image data satisfies the criterion based on whether a value associated with a difference between the image quality of the selected image data in the first format and the image quality of the primary image data in the second format is equal to or less than a threshold.

* * * * *